RE 25636

June 23, 1959 B. D. LOUGHLIN 2,892,021

LUMINANCE-SIGNAL COMPONENT-CONVERSION SYSTEM

Filed Dec. 8, 1954

United States Patent Office 2,892,021

Patented June 23, 1959

2,892,021

LUMINANCE-SIGNAL COMPONENT-CONVERSION SYSTEM

Bernard D. Loughlin, Lynbrook, N.Y., assignor to Hazeltine Research, Inc., Chicago, Ill., a corporation of Illinois Application December 8, 1954, Serial No. 473,915

7 Claims. (Cl. 178—5.4)

*General*

Figure 1:
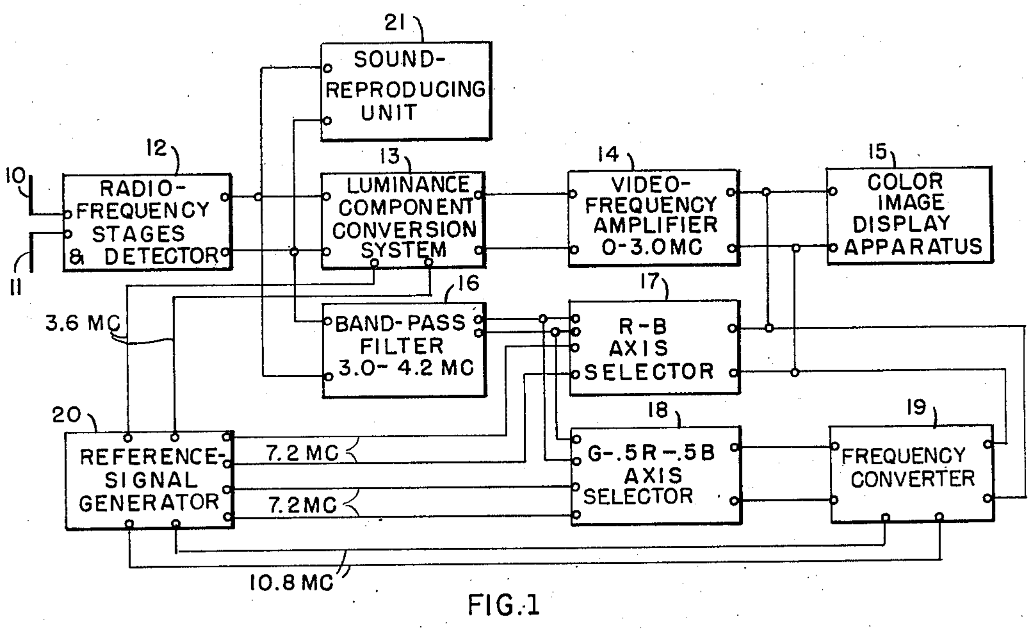

This invention relates to a system useful in a color-television receiver for converting a luminance-signal component, proportioned in a predetermined manner with respect to predetermined primary colors, to a differently proportioned luminance component. The conversion system has particular utility as a so-called Y-to-M converter of a color-television receiver employing a one-gun sequential color image-display apparatus.

Briefly considered, Y-to-M converters are luminance-signal component-conversion systems of the type which converts a luminance-signal component, proportioned in accordance with the relative luminance values of predetermined primary colors, to a luminance component of equal proportions with respect to the primary colors. Luminance-signal component-conversion systems previously proposed by applicant have been described in an article entitled "Processing of the NTSC Color Signal for One-Gun Sequential Color Displays," Proceedings of the I.R.E., January, 1954. Such system are also described and claimed in applicant's copending application Serial No. 339,145, filed February 26, 1953, and entitled "Color-Television Receiver." While these prior systems are entirely satisfactory, they may employ more electron-discharge tubes and other circuit components than may be desirable for some applications. Further, in Y-to-M converters utilizing a single stage for translating a Y component and for deriving from the subcarrier signal by conversion an M–Y luminance correction component to develop a resultant M signal, the ratio of the conversion gain, which determines the amplitude of the derived luminance correction component, to the direct translation gain, which determines the amplitude of the translated Y component, ordinarily is a function of the amplitude of the sampling or heterodyning signal utilized in the converter and the tube characteristics of the heterodyning signal generator and the converter which may vary with tube aging, thereby affecting the stability of the conversion to translation gain ratio over long periods of time.

It is an object of the present invention, therefore, to provide a new and improved luminance-signal component-conversion system of simple and inexpensive construction.

It is another object of the invention to provide a new and improved luminance-signal component-conversion system which has a stable ratio of conversion to translation gain over long time intervals.

In accordance with a particular form of the invention, a system for converting a color-television luminance-signal component proportioned in a predetermined manner with respect to predetermined primary colors to a differently proportioned luminance component comprises first circuit means for supplying a composite color-television signal including a video-frequency luminance-signal component and a chrominance subcarrier signal. The system also includes circuit means coupled to the first circuit means and having a pair of output circuits for deriving in one of the output circuits video-frequency current components representative of the luminance component and a phase-detected luminance-correction signal component in a predetermined ratio and for deriving in the other output circuit video-frequency current components representative of the luminance component and a phase-detected luminance-correction signal component in a different predetermined ratio. The output circuits include means intercoupling the output circuits and responsive to the derived luminance and luminance-correction components for developing a resultant differently proportioned luminance component.

For a better understanding of the present invention, together with other and further objects thereof, reference is had to the following description taken in connection with the accompanying drawing, and its scope will be pointed out in the appended claims.

Figure 2:
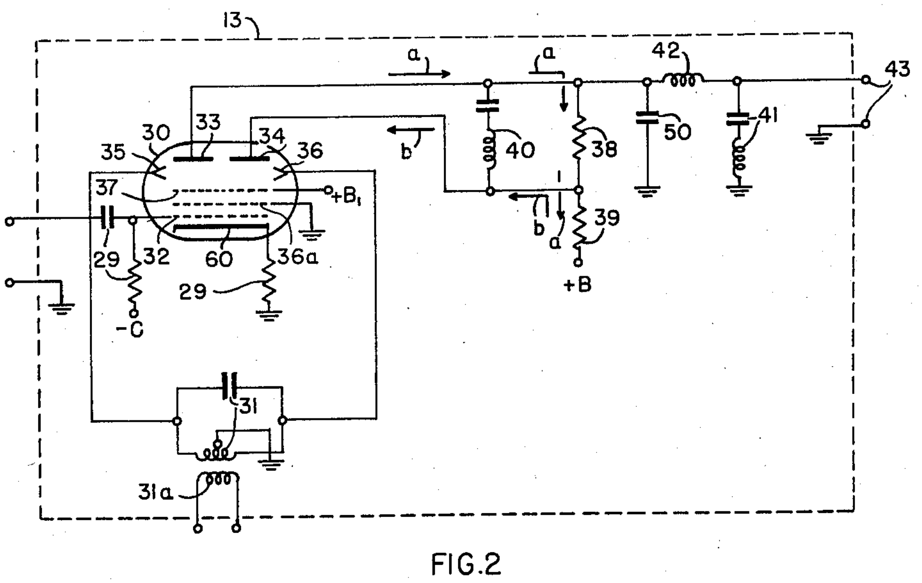

Referring to the drawing:

Fig. 1 is a schematic circuit diagram of a color-television receiver including a luminance-component conversion system constructed in accordance with the invention, and Fig. 2 is a detailed circuit diagram of the luminance-component conversion system of the Fig. 1 receiver.

*Description and operation of Fig. 1 receiver*

Referring now more particularly to Fig. 1 of the drawing, the receiver there represented comprises an antenna system 10, 11 to which there are coupled, in cascade, radio-frequency stages and detector 12, luminance-component conversion system 13, constructed in accordance with the invention and more fully described hereinafter, video-frequency amplifier 14 having a pass band of, for example, 0–3.0 megacycles, and color image-display apparatus 15 which may, for example, be of the well-known focus-mask line-strip type, comprising a cathode-ray tube having a grid structure disposed adjacent phosphor strips on the tube face for controlling the energizing of the strips by the cathode-ray beam. There are also associated with the display apparatus 15 suitable line-scan and field-scan generators (not shown) responsive to synchronizing components of the received television signal.

A band-pass filter 16 having a pass band of, for example, 3.0–4.2 megacycles is coupled to the output circuit of unit 12 for translating the chrominance subcarrier signal and modulation components. An R–B axis selector 17 and a G–.5R–.5B axis selector 18, which may be of a type described in the aforementioned I.R.E. article, respond to the chrominance subcarrier signal translated by the filter 16 for deriving signal components along the R–B and G–.5R–.5B axes of the subcarrier signal at fundamental frequency. The R–B axis selector 17 is coupled to the color image-display apparatus 15 while the G–.5R–.5B axis selector 18 is coupled to a frequency converter 19 which develops signal components at second harmonic frequency and representative of the output signal of the unit 18 for application to the color image-display apparatus 15. Units 13, 17, 18, and 19 utilize reference signals supplied by a reference-signal generator 20 preferably having frequencies of 3.6, 7.2, 7.2, and 10.8 megacycles, respectively, in performing the various operations. The reference-signal generator 20 may be operatively synchronized with the color burst of the transmitted signal by means not shown.

A sound-reproducing unit 21 is coupled to the output circuit of the radio-frequency stages and detector 12 for reproducing sound in a conventional manner. All of the units of the Fig. 1 receiver, with the exception of the unit 13, may be of conventional construction and operation.

*Description of Fig. 2 system*

Referring now more particularly to Fig. 2 of the drawing, the luminance-component conversion system 13 of Fig. 1, constructed in accordance with the invention, is represented in detail in Fig. 2. This system comprises first circuit means for supplying a composite color-television signal including a video-frequency luminance-signal component and a chrominance subcarrier signal. More particularly, the first circuit means comprises the control electrode-cathode circuit 29 of a tube 30 coupled to the unit 12 of Fig. 1.

The system preferably also comprises second circuit means for supplying a reference signal having a frequency equal to that of the subcarrier signal, in particular, a resonant circuit 31 tuned to the frequency of the subcarrier signal and having an input winding 31*a* coupled to the reference-signal generator 20.

The system also includes circuit means coupled to the first and second circuit means and having a pair of output circuits for deriving in each of the output circuits video-frequency current components representative of the luminance component and a phase-detected luminance-correction signal component. This circuit means preferably comprises the electron-discharge tube 30 of the beam-switching type having a beam-intensity control electrode 32 coupled to the first circuit means and having a pair of output electrodes 33, 34 and having electron-beam deflection electrodes 35, 36 coupled to the second cricuit means 31 for switching the electron beam from one output electrode to the other for developing at one of the output electrodes video-frequency current components representative of the luminance component and a phase-detected luminance-correction signal component in a predetermined ratio and for deriving in the other output circuit video-frequency current components representative of said luminance component and a phase-detected luminance-correction signal component in a different predetermined ratio. These ratios may differ in magnitude or in sign or both. The tube 30 also includes the usual cathode 60, a focusing electrode 36*a*, and accelerator electrode 37. This tube may be, for example, of the 6AR8 type described in the January 1954 issue of Transactions of the I.R.E., Professional Group on Broadcast and Television Receivers, in an article by Adler and Heuer, entitled "Color Decoder Simplifications Based on a Beam Deflection Tube," published by the Institute of Radio Engineers, Inc.

The output circuits of the tube 30 include circuit means intercoupling the output electrodes 33, 34 and responsive to the derived luminance-correction components and the luminance component for developing a resultant differently proportioned luminance component. In particular, this circuit means preferably comprises an impedance network responsive to the current components for developing output voltages representing a luminance-correction signal and the luminance component to provide a resultant output voltage representing a differently proportioned luminance component. This impedance network includes, for example, a pair of resistors 38, 39 which jointly serve in series network as an impedance load for video-frequency current flow through the anode 33 while resistor 39 serves as an impedance load for current flow through the anode 34. The impedance network also includes a series-resonant circuit 40 tuned to the subcarrier frequency for translating subcarrier signal components at the subcarrier frequency from one anode to the other, by-passing the anode load resistor 38. A shunt condenser 50, series choke 42, and a series-resonant circuit 41 tuned to the subcarrier frequency serve as video-frequency load impedance elements in parallel with resistors 38, 39 to impart a desired pass band to the unit 13.

*Operation of Fig. 2 system*

Considering now the operation of the Fig. 2 system, a composite color-television signal including a video-frequency luminance-signal component and a chrominance subcarrier signal is applied to the control electrode-cathode circuit of the tube 30 by the unit 12 and is effective to modulate the intensity of the electron beam thereof. The reference-signal generator 20 applies a reference signal having a frequency equal to that of the subcarrier signal to the beam-deflection electrodes 35, 36 to deflect the electron beam from one anode to the other. Accordingly, the tube 30 with associated circuit is effective as a synchronous phase detector to derive current components at the anodes 33, 34 which are representative of the intensity of the chrominance subcarrier signal at predetermined phase points of the subcarrier signal. Thus, in accordance with the principles of synchronous detection and as more fully explained in the aforesaid I.R.E. article, by properly adjusting the phase of the reference signal relative to the phase of the chrominance subcarrier signal, a current component is derived at each anode having an amplitude proportional to, for example, the M–Y luminance component which is the desired luminance-correction component for a symmetrically sampled one-gun sequential display, such as a display utilizing an idealized focus-mask line-strip tube. The M–Y luminance component is a component which represents the difference between a luminance component (M) equally proportioned with respect to predetermined primary colors and a luminance component (Y) proportioned in accordance with the relative luminance values of predetermined primary colors. In an idealized symmetrically sampled one-gun tube, the effective color primaries are those corresponding to the signal components transmitted in the NTSC luminance signal. However, in many currently available such tubes, the effective color primaries are other than desired because of secondary electron scattering within the tube which causes contamination of the light emitted by a given phosphor with light from other phosphors. The desired luminance correction component for such a tube would then represent the difference between a luminance component which is unequally proportioned with respect to predetermined primary colors and the luminance component (Y).

Since the current flow at the anodes 33, 34 occurs during different halves of the subcarrier cycle, the luminance-correction components contained in the currents at the anodes 33, 34 are of opposite polarity, that is, one appears as anode-current increase while the other appears as anode-current decrease, represented by incremental currents flowing in opposite directions at the anodes. Thus, the luminance-correction component of the current flow through anode 33, for example, represented by arrows *a*, *a* is effective to develop a phase-detected voltage component across resistors 38 and 39 while the luminance-correction component of the current flow through anode 34 is effective to develop a voltage component of the opposite polarity across resistor 39 because the luminance-correction current component at anode 34, represented by arrows *b*, *b*, is of opposite polarity to the luminance-correction current component at anode 33 and thus the two luminance-correction components flow in opposite directions through resistor 39.

It can be shown by a Fourier analysis of the effective switching wave form of the currents at anodes 33 and 34 that a portion of the original luminance component is derived at each of the anodes 33 and 34 with the same phase. The luminance component derived at anode 33 develops an output voltage across resistors 38 and 39. The luminance component at anode 34 develops a voltage across resistor 39 of the same polarity as that developed by the current derived at anode 33.

In this connection, note that because of the physical relation of the anodes 33, 34 to the beam-deflection electrodes, the output circuits of the tube 30 are activated in accordance with an approximately rectangular wave-switching function by a reference signal of sufficient magnitude to deflect all the space current from one anode to the other although the reference signal supplied to the beam-deflection electrodes 35, 36 may be sinusoidal. Moreover, the anode currents are substantially independent of anode voltage over a given operating range of the tube because of the presence of the accelerator electrode 37. Accordingly, luminance-current components of equal magnitude and luminance-correction current components of equal magnitude but opposite sign are derived at the anodes 33, 34.

By Fourier analysis of the effective switching wave form of the currents at anodes 33, 34, it can be shown that the translation gain (T) with respect to the luminance component has a value:

$$T=(R_{38}+2R_{39})K \quad (1)$$

where $R_{38}$=value of resistor 38
$R_{39}$=value of resistor 39
$K$=constant proportional to amplitude of direct-current component of switching wave form Likewise, the conversion gain (C) with respect to the luminance-correction component has a value:

$$C=R_{38}K_1 \quad (2)$$

where $K_1$= constant proportional to amplitude of fundamental component of switching wave form. For a 50 percent duty cycle of current flow at each anode in accordance with an effectively rectangular balanced switching signal:

$$\frac{K}{K_1}=\frac{\pi}{2} \quad (3)$$

Note that the switching operation of the tube 30 is independent of the switching or reference signal so long as the amplitude remains above a predetermined minimum value sufficient to deflect all the space current of the tube from one anode to the other. Thus, for a given type of switching or reference signal determining the ratio of constants K and $K_1$ of Equations 1 and 2, the relative amplitudes of the M–Y and the Y components at terminals 43, 43 are determined in accordance with the relative values of the resistors 38, 39. In other words, for a given type of switching or reference signal, the conversion to translation gain ratio is determined in accordance with relative values of the resistors 38 and 39. The preferred conversion to translation gain ratio is determined by the axis of synchronous detection of the luminance-correction signal and inversely by the amplitude of the correction signal as it inherently appears along the axis of detection as compared with the desired amplitude of the correction signal for the focus-mask line-strip tube employed. For example, if a luminance-correction signal M–Y is derived along an axis leading the B–Y axis of the subcarrier signal by an angle of, for example, 19° as explained in the aforementioned I.R.E. article, the preferred ratio of conversion to translation gain is the factor .58 which is the reciprocal of the relative amplitude of the M–Y component as it appears along the axis of detection with respect to the luminance component. To provide a conversion to translation gain factor of .58, in the Fig. 2 system the ratio of resistors 38 and 39 is, for example, approximately 20:1. For many currently available sequentially sampled one-gun tubes, the preferred ratio of conversion to translation gain is substantially less than .58 and the ratio of the values of resistors 38 and 39 would then be substantially less than 20:1.

As previously mentioned, the switching operation of the tube 30 is independent of the amplitude of the switching or reference signal so long as the amplitude remains above a predetermined minimum value sufficient to deflect all the space current of the tube from one anode to the other. Also, the switching operation is substantially unaffected by tube characteristics such as gain. Accordingly, for a given type of reference signal, the conversion to translation gain ratio is determined by relatively stable passive circuit elements comprising resistors 38, 39 and is independent of variations of the amplitude of the reference signal. Hence, the system has the advantage that it provides a stable ratio of conversion to translation gain while utilizing a minimum number of tubes. Moreover, this ratio may be determined at a desired value by proportioning the relative values of the resistors 38, 39 without affecting the stability of the system.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for converting a color-television luminance-signal component proportioned in accordance with the relative luminance values of predetermined primary colors to a differently proportioned luminance component comprising: first circuit means for supplying a composite color-television signal including a video-frequency luminance-signal component and a chrominance subcarrier signal; second circuit means for supplying a reference signal having a frequency equal to that of said subcarrier signal; electrode-controlled circuit means comprising an electron-discharge tube of the beam-switching type having a beam-intensity control electrode coupled to said first circuit means and having a pair of output electrodes and having electron-beam deflection electrodes coupled to said second circuit means for switching the electron beam from one output electrode to the other to develop at said output electrodes video-frequency current components of the same polarity and representative of said luminance component and video-frequency current components of opposite polarity to each other and representative of phase-detected luminance-correction signal components; and an impedance network responsive to said current components for developing output voltage components representing a luminance-correction signal and said luminance component to provide a resultant output voltage representing a differently proportioned luminance component.

2. A system for converting a color-television luminance-signal component proportioned in a predetermined manner with respect to predetermined primary colors to a differently proportioned luminance component comprising: first circuit means for supplying a composite color-television signal including a video-frequency luminance-signal component and a chrominance subcarrier signal; and circuit means coupled to said first circuit means and having a pair of output circuits for deriving in one of said output circuits video-frequency current components representative of said luminance component and a phase-detected luminance-correction signal component in a predetermined ratio and for deriving in the other output circuit video-frequency current components representative of said luminance component and a phase-detected luminance-correction signal component in a different predetermined ratio; said output circuits including means intercoupling said output circuits and responsive to said derived luminance and luminance-correction components for developing a resultant differently proportioned luminance component.

3. A system for converting a color-television luminance-signal component proportioned in a predetermined manner with respect to predetermined primary colors to a differently proportioned luminance component comprising: first circuit means for supplying a composite color-television signal including a video-frequency luminance-signal component and a chrominance subcarrier signal; second circuit means for supplying a reference signal having a frequency equal to that of said subcarrier signal; electrode-controlled circuit means having a beam-intensity control electrode coupled to said first circuit means and having a pair of output electrodes and having electron-beam deflection means coupled to said second circuit means for developing at one of said output electrodes video-frequency current components representative of said luminance component and a phase-detected luminance-correction signal component in a predetermined ratio and for developing at the other output electrode video-frequency current components representative of said luminance component and a phase-detected luminance-correction signal component in a different predetermined ratio; and circuit means coupled to said output electrodes and responsive to said luminance-correction components and said luminance component for developing a resultant differently proportioned luminance component.

4. A system for converting a color-television luminance-signal component proportioned in a predetermined manner with respect to predetermined primary colors to a differently proportioned luminance component comprising: first circuit means for supplying a composite color-television signal including a video-frequency luminance-signal component and a chrominance subcarrier signal; second circuit means for supplying a reference signal having a frequency equal to that of said subcarrier signal; electrode-controlled circuit means comprising an electron-discharge tube of the beam-switching type having a beam-intensity control electrode coupled to said first circuit means and having a pair of output electrodes and having electron-beam deflection electrodes coupled to said second circuit means for switching the electron beam from one output electrode to the other to develop at one of said output electrodes video-frequency current components representative of said luminance component and a phase-detected luminance-correction signal component in a predetermined ratio and for developing at the other output electrode video-frequency current components representative of said luminance component and a phase-detected luminance-correction signal component in a different predetermined ratio; and circuit means coupled to said output electrodes and responsive to said luminance-correction components and said luminance component for developing a resultant differently proportioned luminance component.

5. A system for converting a color-television luminance-signal component proportioned in a predetermined manner with respect to predetermined primary colors to a differently proportioned luminance component comprising: first circuit means for supplying a composite color-television signal including a video-frequency luminance-signal component and a chrominance subcarrier signal; second circuit means for supplying a reference signal having a frequency equal to that of said subcarrier signal; circuit means coupled to said first and second circuit means and having a pair of output circuits and including a pair of detector circuits for deriving in said output circuits video-frequency current components of the same polarity and representative of said luminance component and video-frequency current components of opposite polarity to each other and representative of phase-detected luminance-correction signal components; and circuit means included in said output circuits and responsive to said luminance-correction components and said luminance component for developing a resultant differently proportioned luminance component.

6. A system for converting a color-television luminance-signal component proportioned in a predetermined manner with respect to predetermined primary colors to a differently proportioned luminance component comprising: first circuit means for supplying a composite color-television signal including a video-frequency luminance-signal component and a chrominance subcarrier signal; second circuit means for supplying a reference signal having a frequency equal to that of said subcarrier signal; and circuit means coupled to said first and second circuit means and having a pair of output circuits activated during different half cycles of said reference signal in accordance with an approximately rectangular wave-switching function for deriving in one of said output circuits video-frequency current components representative of said luminance component and a phase-detected luminance-correction signal component in a predetermined ratio and for deriving in the other output circuit video-frequency current components representative of said luminance component and a phase-detected luminance-correction signal component in a predetermined ratio of opposite sign; said output circuits being so coupled as to derive from said luminance and luminance-correction components a resultant differently proportioned luminance component.

7. A system for converting a color-television luminance-signal component proportioned in a predetermined manner with respect to predetermined primary colors to a differently proportioned luminance component comprising: first circuit means for supplying a composite color-television signal including a video-frequency luminance-signal component and a chrominance subcarrier signal; circuit means coupled to said first circuit means and having a pair of output circuits for deriving in one of said output circuits video-frequency current components representative of said luminance component and a phase-detected luminance-correction signal component in a predetermined ratio and for deriving in the other output circuit video-frequency current components representative of said luminance component and a phase-detected luminance-correction signal component in a different predetermined ratio; and an impedance network responsive to said current components for developing output voltage components representing a luminance-correction signal and said luminance component in a desired ratio to provide a resultant output voltage representing a differently proportioned luminance component.

References Cited in the file of this patent

UNITED STATES PATENTS

| | | |
|---|---|---|
| 2,644,030 | Moore | June 30, 1953 |
| 2,680,147 | Rhodes | June 1, 1954 |
| 2,681,379 | Schroeder | June 15, 1954 |
| 2,743,310 | Schroeder | Apr. 24, 1956 |
| 2,754,356 | Espenlaub | July 10, 1956 |

OTHER REFERENCES

Color TV, Rider Pub., March 1954, pages 141, 142.

Two-Color Receiver, RCA, November 1949, pages 9, 10.